United States Patent Office.

OTTO WUTH, OF PITTSBURG, PENNSYLVANIA.

Letters Patent No. 96,374, dated November 2, 1869.

IMPROVEMENT IN THE MANUFACTURE OF CARBONATE OF SODA.

The Schedule referred to in these Letters Patent and making part of the same.

*To all whom it may concern:*

Be it known that I, OTTO WUTH, of the city of Pittsburg, in the county of Allegheny, and State of Pennsylvania, have invented a new and useful Improvement in the Manufacture of Carbonate of Soda; and I do hereby declare the following to be a full, clear, and exact description thereof.

My improvement relates to the production from the soda-ash of commerce, of a commercially pure carbonate of soda, equally as pure as the bicarbonate of soda of commerce, and containing a much larger percentage of soda.

The soda-ash of commerce usually contains, besides the carbonate of soda, a considerable quantity of impurities, consisting of sulphate of soda, silicate of soda, and chloride of sodium, with traces of alumina and peroxide of iron.

These impurities render even the highest grades of the soda-ash of commerce unfit for use in various branches of manufacture, which require the employment of a pure carbonate of soda.

In order to obtain the carbonate of soda free from the sulphate of soda, chloride of sodium, and other impurities, these manufacturers are driven to the use of the bicarbonate of soda, a much more expensive article, containing only about thirty-seven per cent. of soda.

The object of my invention is to produce from the soda-ash of commerce a monohydrate of carbonate of soda, (which, by drying, yields anhydrous carbonate of soda,) equally pure as the bicarbonate of soda of commerce, and sufficiently so for all practical purposes, which shall contain about eighty-four per cent. of soda, and sixteen per cent. of water, and in so doing to make no loss of soda, the residuum being a low grade of soda-ash sufficiently pure for various purposes, such as the manufacture of soap.

To enable others skilled in the art to use my improvement, I will proceed to describe the process which I claim as my invention.

I take the soda-ash of commerce (preferring that of high grade containing from fifty-four to fifty-six per cent. of soda) and dissolve it in water, heated either by an open fire or by steam, taking care to produce a saturated solution, but not to cause sufficient evaporation to produce precipitation.

This saturated solution is then filtered, so as to yield a clear liquor, free from insoluble substances or undissolved particles.

The filtered liquor is then placed in a suitable boiler, and exposed to heat until about one-half of the water is evaporated, during which process there is precipitated a monohydrate of carbonate of soda, containing about eighty-four per cent. of carbonate of soda, and nearly free from the impurities which were present in the soda-ash, but which are held in solution in the remaining liquor.

The liquor is then decanted into suitable vessels, and the monohydrate of carbonate of soda is removed, and, if desired, may, by exposure to heat in the usual way, until the water is driven off, be converted into anhydrous carbonate of soda.

The resulting liquor decanted from the monohydrate of carbonate of soda, as just stated, is then left to cool and settle for several days, or long enough for a large portion of the carbonate of soda which it contains to crystallize out.

These crystals are sal-soda, containing about ten equivalents of water, and about the same percentage of impurities as did the soda-ash used at the commencement of the process, or less.

These crystals of sal-soda are used alone, or with fresh soda-ash, in the repetition of the process above described.

After so much of the sal-soda as will crystallize out of the cooled liquor resulting from the evaporation of the original soda-ash is removed, the resulting mother-liquor (containing the remaining impurities not carried off by the crystals of sal-soda) is evaporated to dryness, and yields a low grade of soda-ash, containing more of the sulphate of soda and chloride of sodium than the original soda-ash, but yet sufficiently pure for the use of soap-manufacturers, and some other purposes.

The monohydrate of carbonate of soda thus obtained will answer very well for the use of glass-manufacturers, and other purposes where the presence of the water is not injurious, while if anhydrous carbonate of soda is desired, it can easily be obtained by driving off the water, as before described.

The article which I produce by the process above described is very easily and cheaply manufactured, and is an article much needed, but not heretofore manufactured so as to be accessible for use in the arts.

It is so much purer than even the best of soda-ash as manufactured for commercial purposes, that it can be employed where that article, by reason of its impurities, cannot be used, and it contains so much larger percentage of soda, and is so much cheaper than the bicarbonate, that it must take its place for very many purposes.

What I claim as my invention, and desire to secure by Letters Patent, is—

1. The process, hereinbefore described, of producing commercially pure monohydrate of carbonate of soda from the soda-ash of commerce.

2. The process, hereinbefore described, whereby, from the residual liquor of the process first described, (for obtaining the monohydrate of carbonate of soda,) sal-soda and a low grade of soda-ash are procured, thereby avoiding any loss of soda in the process.

In testimony whereof, I, the said OTTO WUTH, have hereunto set my hand.

O. WUTH.

Witnesses:
JOHN GLENN,
THOS. B. KERR.